(12) United States Patent
Kim

(10) Patent No.: US 7,177,345 B2
(45) Date of Patent: Feb. 13, 2007

(54) DEMODULATING DEVICE AND METHOD FOR W-CDMA BASE STATION

(75) Inventor: Kwang Soon Kim, Daejeon (KR)

(73) Assignee: Electronics and Telecommunication Research Institute, Daejeon (KR)

( * ) Notice: Subject to any disclaimer, the term of this patent is extended or adjusted under 35 U.S.C. 154(b) by 1069 days.

(21) Appl. No.: 10/147,974

(22) Filed: May 20, 2002

(65) Prior Publication Data
US 2003/0117989 A1    Jun. 26, 2003

(30) Foreign Application Priority Data
Dec. 24, 2001   (KR) ...................... 10-2001-0084443

(51) Int. Cl.
*H04L 27/30* (2006.01)
(52) U.S. Cl. ...................... 375/144; 375/148; 375/267; 375/343; 375/349; 370/342; 370/441; 370/479
(58) Field of Classification Search ................ 375/141, 375/144, 147, 148, 260, 267, 285, 324, 340, 375/346, 347, 349; 370/321, 337, 347, 442, 370/478, 320, 328, 335, 342, 441, 464, 462, 370/479; 455/50.1, 52.3, 63, 65, 132, 135, 455/137, 296
See application file for complete search history.

(56) References Cited

U.S. PATENT DOCUMENTS 5,999,560 A * 12/1999 Ono ........................... 375/148
6,026,115 A * 2/2000 Higashi et al. ............. 375/148
6,208,632 B1 3/2001 Kowalski et al.
6,215,814 B1 4/2001 Ylitalo et al.
6,314,131 B1 11/2001 Roe et al.
6,529,545 B2 * 3/2003 Tiirola et al. ................ 375/148

OTHER PUBLICATIONS

Kwang Soon Kim; A Data-Aided Channel Esimation Technique For Coherent DS/CDMA Systems Using Maximum Doppler Frequency Estimation and Blind Spreading Factor Detection; Research Paper of Radio and Broadcasting Technology Lab., Electronics and Telecommunications Research Institute;pp. 1-4.

* cited by examiner

*Primary Examiner*—Dac V. Ha
(74) *Attorney, Agent, or Firm*—Mayer Brown Rowe & Maw LLP (57) ABSTRACT

A demodulator of a W-CDMA base station comprises: a chip calculator for de-spreading signals received through sectors including antennas; a symbol calculator for using symbols of a control channel and a data channel from the de-spread signals, estimating a channel, and combining signals input through a multi-path; a frame calculator for combining the combined signals to perform transport format combination indicator decoding, feedback information decoding, frame sync estimation, SNR estimation, post-combining, and second de-interleaving; a storage unit for storing outputs of the chip calculator, symbol calculator, and frame calculator; a storage unit controller for controlling inputs/outputs between the chip calculator, symbol calculator, frame calculator, and storage unit; and a host interface for controlling inputs/outputs between the chip calculator, symbol calculator, frame calculator, and host.

15 Claims, 8 Drawing Sheets

DEMODULATING DEVICE AND METHOD FOR W-CDMA BASE STATION

BACKGROUND OF THE INVENTION (a) Field of the Invention

The present invention relates to a wideband code division access (W-CDMA) system. More specifically, the present invention relates to a demodulating device and method for W-CDMA base stations.

(b) Description of the Related Art

When implementing demodulators used for base stations of conventional CDMA systems using protocols such as the IS-95, resources including fingers and storage devices are previously established and allocated to the demodulators for each channel, and these channel components are assembled in parallel to allow for a plurality of channels together.

However, differing from the conventional communication systems, since the W-CDMA systems are required to concurrently provide services that have different resource sizes such as speech and image services, it is not effective to previously set the resources and allocate them.

Also, the demodulators for the conventional CDMA base stations use a non-coherent demodulation method that does not require channel estimation, but the third generation systems as well as the W-CDMA system use a coherent demodulation method, and accordingly, it is very important to improve performance of channel estimation when desiring to increase radio capacity of the system.

Regarding the W-CDMA standards, functions executed by the demodulator of a base station include data demodulation, transport format combination indicator (TFCI) decoding, feedback information (FBI) decoding, power control bits demodulating and signal-to-noise ratio (SNR) measurement.

However, they all have different time delay and reliability conditions. For example, the data demodulation and the TFCI decoding require high reliabilities when allowing a little time delay, the FBI decoding needs to have good reliability and not much time delay, and the power control bits demodulating require minimization of time delay when allowing somewhat low reliability.

Therefore, it is required for the demodulator used for the W-CDMA system to perform the decoding process differently depending on the time delay and reliability conditions.

SUMMARY OF THE INVENTION

It is an object of the present invention to provide a demodulating device and method for a W-CDMA base station for processing a plurality of channels or finger devices by use of time division to improve device performance, graduating the decoding process to satisfy various kinds of time delay and reliability requirements required by the W-CDMA system, and estimating the channels through a plurality of steps to improve performance of channel estimation.

In one aspect of the present invention, a demodulator of a wideband code division access (W-CDMA) system base station comprises: a chip calculator for receiving signals through a plurality of sectors each of which includes a plurality of antennas, and de-spreading the received signals; a symbol calculator for selectively using symbols of a control channel and a data channel from the signals de-spread by the chip calculator, estimating a channel, and combining the signals input through a multi-path; a frame calculator for combining the signals combined by the symbol calculator for each frame to perform transport format combination indicator (TFCI) decoding, feedback information (FBI) decoding, frame sync estimation, signal to noise ratio (SNR) estimation, and post-combining and second de-interleaving calculation; a storage unit for storing output values of the chip calculator, the symbol calculator, and the frame calculator; a storage unit controller for controlling input/output signals between the chip calculator, the symbol calculator, the frame calculator, and the storage unit; and a host interface for controlling input/output signals between the chip calculator, the symbol calculator, the frame calculator, and a host.

The chip calculator comprises: a finger pool including a plurality of finger units for de-spreading the signals received from each sector into a minimum spreading factor; and a channel scheduler for arranging the signals output from each finger unit of the finger pool in a queue through scheduling, and adding a tag for representing a number of each finger unit.

The chip calculator further comprises a time tracker for referring to output signals of the channel scheduler to adjust de-spreading start positions of each finger unit of the finger pool.

The symbol calculator comprises: a first channel estimator for using a pilot symbol from among de-spread symbols output from the chip calculator to estimate a channel through time division; a first RAKE combiner for using a first channel estimation value output from the first channel estimator, and combining the signals output from the finger unit that is dynamically allocated to each user to generate first combined information, and using the first combined information to remove a data part of a control channel's symbol that is not the pilot symbol to generate a first extended pilot symbol; a second channel estimator for using the first extended pilot symbol to estimate the channel again to yield a second channel estimation value; a second RAKE combiner for using the second channel estimation value output from the second channel estimator and recombining the signals output from the finger unit that is dynamically allocated to each user to generate second combined information, and using the second combined information to remove data parts of the control channel's symbol that are not the pilot symbol and of the data channel's symbol and generate a second extended pilot symbol; a third channel estimator for using the second extended pilot symbol to estimate the channel again to yield a third channel estimation value; and a third RAKE combiner for using the third channel estimation value output from the third channel estimator to combine the signals output from the finger unit that is dynamically allocated to each user and generate third combined information.

The symbol calculator further comprises a spreading factor estimator for using symbols of a data channel among de-spread signals output from the chip calculator to estimate a spreading factor of the data channel, and the second RAKE combiner uses a spreading factor output from the spreading factor estimator to remove a data portion from the data channel.

The frame calculator comprises: a combined information storage unit for classifying control channel information output from the symbol calculator into a pilot symbol, a TFCI symbol, an FBI's S field symbol, an FBI's D field symbol, and a transmission power control (TPC) symbol according to at least one condition of time delay and reliability conditions, and storing them; a TFCI decoder for using a TFCI symbol of the combined information storage unit to perform TFCI decoding during a frame and detect a spreading factor of a data channel of a frame; an FBI decoder for using the FBI's S field symbol and the FBI's D field symbol of the combined information storage unit to perform FBI decoding; a frame sync.estimator for using a pilot symbol of the combined information storage unit to check whether the frame is synchronized; an SNR estimator for using a pilot symbol of the combined information storage unit to estimate an SNR of an uplink channel; and a post-combiner and second de-interleaver for using a data channel spreading factor obtained by decoding the TFCI symbol by the TFCI decoder to perform post-combining on the data channel symbol, and using a data channel spreading factor and compressed mode information to perform a second de-interleaving.

In another aspect of the present invention, a demodulation method of a W-CDMA base station comprises: (a) receiving signals from a plurality of sectors each of which includes a plurality of antennas, and de-spreading the received signals at a finger unit that is dynamically allocated to each user; (b) selectively using symbols of a control channel and a data channel from the de-spread signals to estimate a channel, and using a value obtained by channel estimation to combine signals input through a multi-path; and (c) classifying the combined signals according to at least one condition of time delay and reliability conditions, and performing TFCI decoding, FBI decoding, frame sync estimation, SNR estimation, post-combination, and second de-interleaving.

The step (a) comprises: arranging the de-spread signals in a queue through scheduling, and adding a tag for representing a number of each finger unit to each de-spread signal; and referring to the de-spread signals to control de-spreading start positions of the finger unit.

The step (b) comprises: using a pilot symbol of the de-spread signal to estimate a first channel through time division; using a first channel estimation value and combining signals output from the finger unit that is dynamically allocated to each user to generate first combined information, and using the first combined information and removing a data portion of a control channel's symbol that is not the pilot symbol to generate a first extended pilot symbol; using the first extended pilot symbol to estimate the channel again to yield a second channel estimation value; using the second channel estimation value and recombining a signal output from a finger unit that is dynamically allocated to each user to generate second combined information, and using the second combined information and removing a control channel's symbol that is not the pilot symbol and a data portion of a data channel's symbol to generate a second extended pilot symbol; using the second extended pilot symbol to estimate the channel again to yield a third channel estimation value; and using the third channel estimation value and recombining a signal output from the finger unit that is dynamically allocated to each user to generate third combined information.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIGS. 7($a$) to 7($c$) show flowcharts of a symbol decoding step in a base station demodulating method according to a preferred embodiment of the present invention;

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
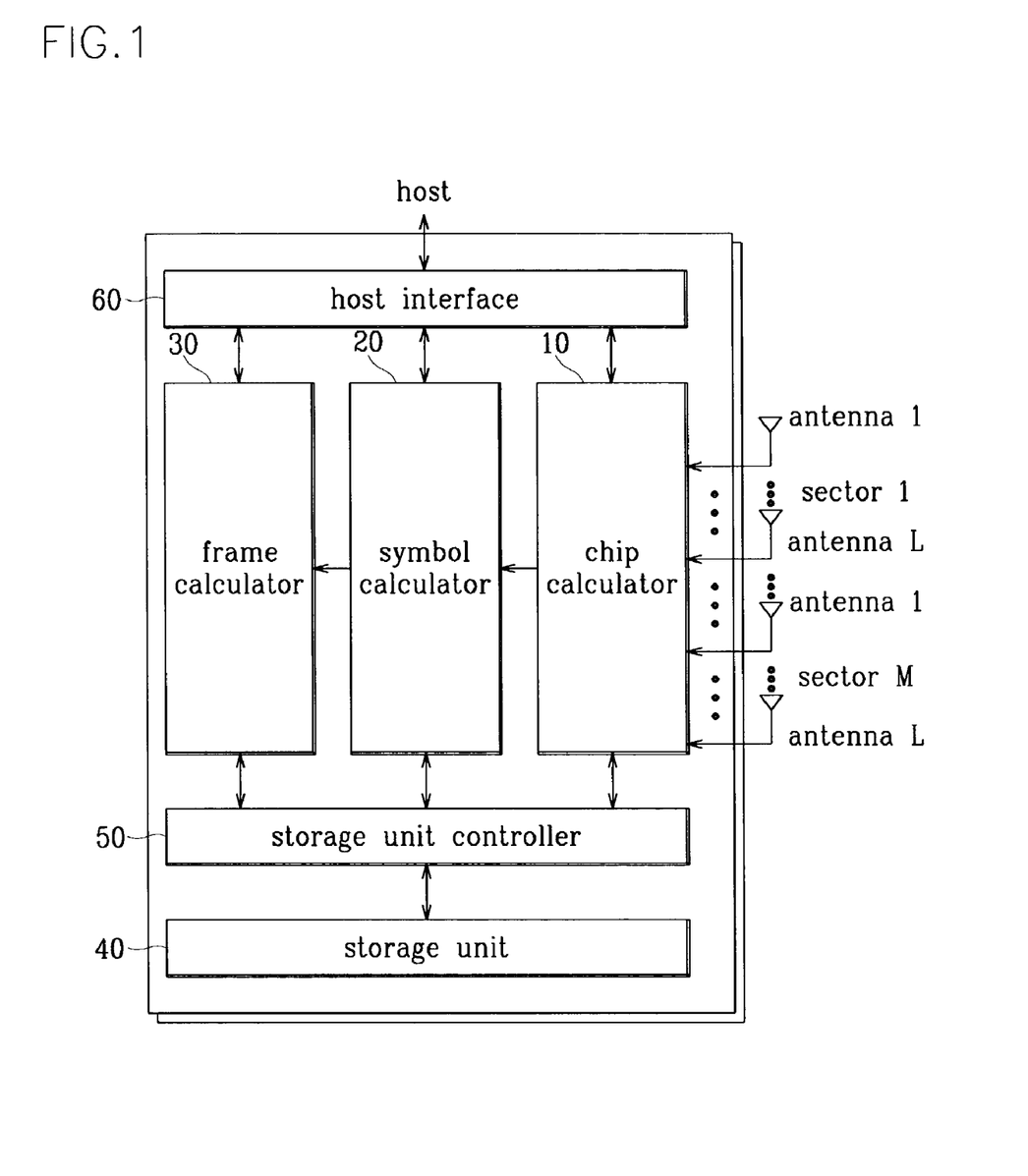
FIG. 1 shows a block diagram for a base station demodulator according to a preferred embodiment of the present invention.

FIG. 1 shows a brief block diagram for a base station demodulator according to a preferred embodiment of the present invention.

As shown, the base station demodulator comprises a chip calculator 10; a symbol calculator 20; a frame calculator 30; a storage unit 40; a storage unit controller 50; and a host interface 60.

The chip calculator 10 selects desired signals according to a predetermined setting, the signals being input from M sectors each of which includes L antennas through which the signals are received, de-spreads them with minimum spreading factor, and aligns the signals through scheduling.

The symbol calculator 20 uses de-spread signals of the chip calculator 10 to estimate a channel, and combines the de-spread signals output by a finger unit that is dynamically allocated to each user to generate combined information.

The frame calculator 30 uses the combined information output by the symbol calculator 20 to perform TFCI decoding, FBI decoding, frame sync estimation, post combining, second de-interleaving, and SNR estimation, according to delay time and reliability conditions.

The storage unit 40 stores outputs generated by the chip calculator 10, the symbol calculator 20, and the frame calculator 30 so as to use them when necessary.

The storage unit controller 50 controls inputs and outputs between the chip calculator 10, the symbol calculator 20, the frame calculator 30, and the storage unit 40.

The host interface 60 controls inputs and outputs between the chip calculator 10, the symbol calculator 20, the frame calculator 30 and an external host.

Figure 2:
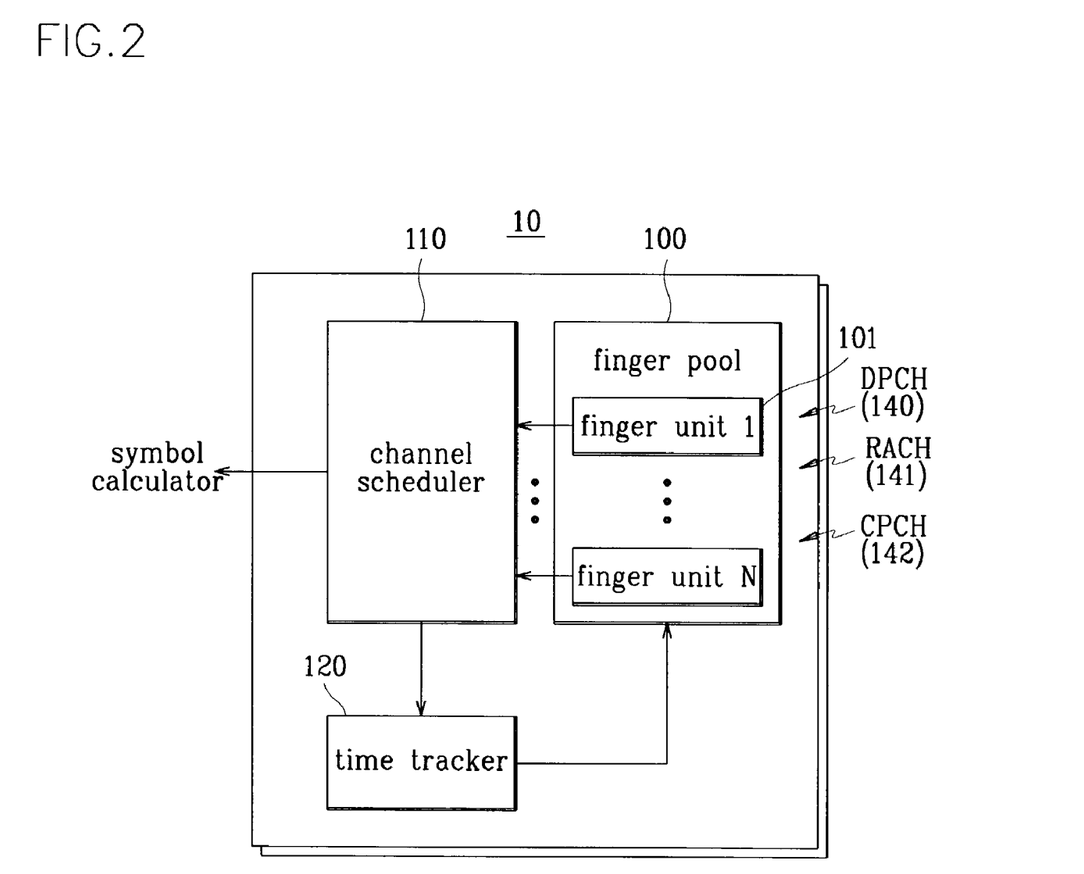
FIG. 2 shows a chip calculator of the base station demodulator according to a preferred embodiment of the present invention.

FIG. 2 shows a detailed block diagram of the chip calculator 10 of the base station demodulator according to a preferred embodiment of the present invention.

As shown, the chip calculator 10 comprises a finger pool 100; a channel scheduler 110; and a time tracker 120.

The finger pool 100 combines N finger units 101 into a single pool.

Each finger unit 101 operates by a clocking speed 16 times faster than 3.84 Mcps, that is, the chip speed of the W-CDMA standard, and performs de-spreading of 16 uplink channels through time division. In this instance, each finger unit 101 may de-spread the W-CDMA uplink channels according to a predetermined setting, including a dedicated physical channel (DPCH) 140, a random access channel (RACH) 141, and a common packet channel (CPCH) 142, and processes signals received through a plurality of antennas in a sector.

The spreading factors of data channels at each finger unit 101 may vary from 4 to 256 according to the W-CDMA standard.

The channel scheduler 110 schedules the signals output from the N finger units 101 to arrange them in a queue, and outputs them to the symbol calculator 20. In this instance, the channel scheduler 110 provides the output signals with a tag for representing the respective finger units' numbers so that a later processing of the output signal can detect the number of finger unit where the output signal comes from, by using the tag.

The time tracker 120 uses the output signals of the channel scheduler 110 to adjust de-spreading start positions of components within the respective finger units 101, and processes the signals of the finger units 101 through time division.

Figure 3:
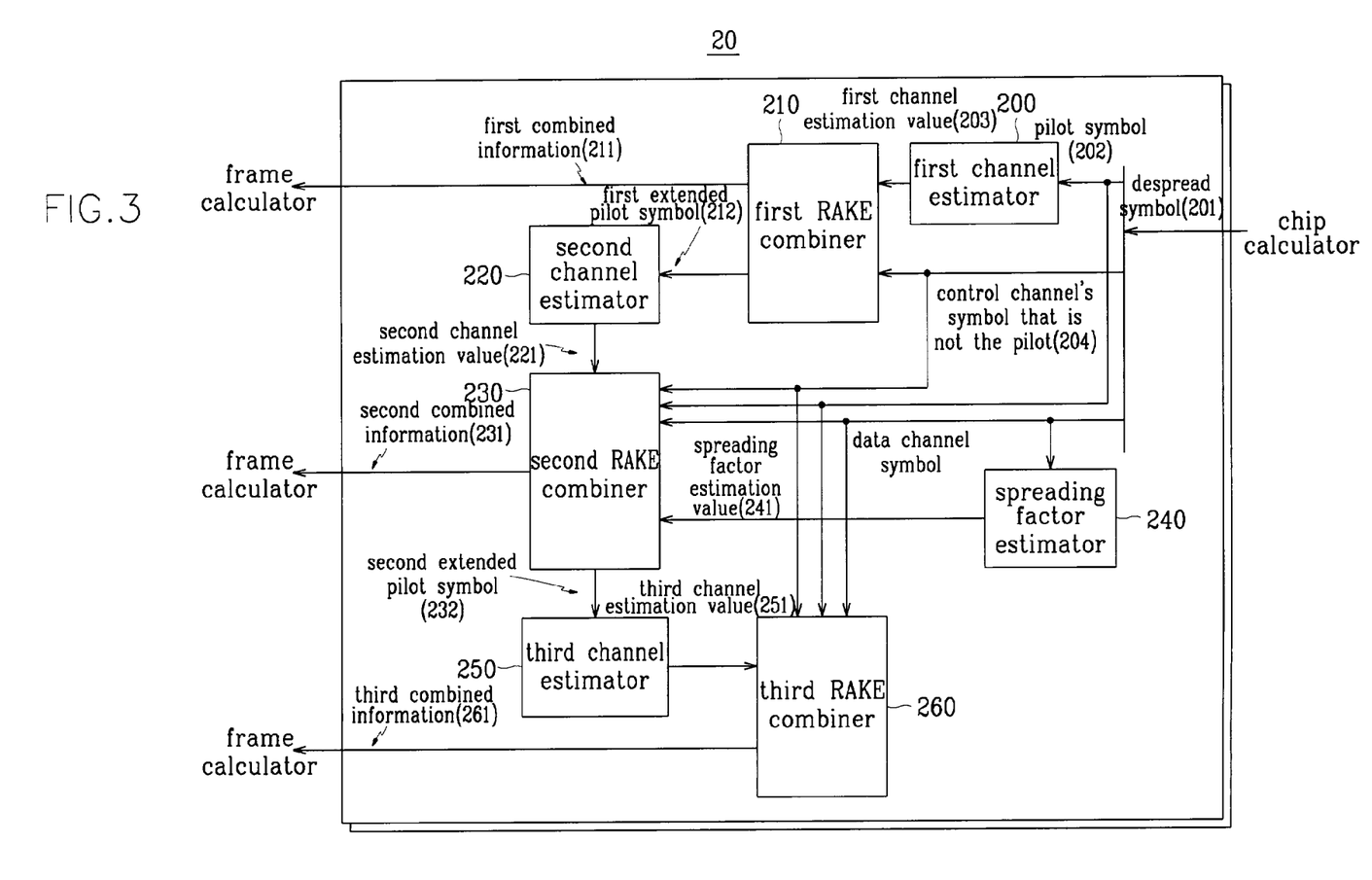
FIG. 3 shows a symbol calculator of the base station demodulator according to a preferred embodiment of the present invention.

FIG. 3 shows the symbol calculator 20 of the base station demodulator according to a preferred embodiment of the present invention.

As shown, the symbol calculator 20 comprises: a first channel estimator 200; a first RAKE combiner 210; a second channel estimator 220; a second RAKE combiner 230; a spreading factor estimator 240; a third channel estimator 250; and a third RAKE combiner 260.

The first channel estimator 200 uses a control channel's pilot symbol 202 from among de-spread symbols 201 of various channels input from the chip calculator 10 to estimate a channel through time division.

The first RAKE combiner 210 uses a first channel estimation value 203 output from the first channel estimator 200 and combines the signals output from the finger units that are dynamically allocated to each user to generate first combined information 211, and removes a signal part of a control channel's symbol 204 that is not the pilot symbol from among de-spread symbols 201 of various channels input from the chip calculator 10 through decision feedback to generate a first extended pilot symbol 212.

The second channel estimator 220 uses the first extended pilot symbol 212 to estimate the channel again to yield a second channel estimation value through time division.

The second RAKE combiner 230 uses a second channel estimation value 221 output from the second channel estimator 220 and combines the signals output from the finger units that are dynamically allocated to each user to generate second combined information 231, and also uses the second combined information 231 to remove the signal parts of the control channel's symbol 204 that is not the pilot symbol and the signal parts of the data channel's symbol 205 through decision feedback and generate a second extended pilot symbol 232.

In this instance, the data channel's symbol, the signal part of which is removed, is accumulated again as the amount of the control channel's spreading factor and is then combined with the control channel's symbol.

In addition, when the data channel symbols are combined, a spreading factor estimation value 241 is used that is obtained only from the data channel's symbols themselves in the spreading factor estimator 240 through time division.

The third channel estimator 250 uses the second extended pilot symbol 232 to finally estimate the channel again to yield a third channel estimation value 251.

The third RAKE combiner 260 uses the third channel estimation value 251 to combine the signals output from the finger units that are dynamically allocated to each user again and generates third combined information 261.

The first to third channel estimators 200, 220, and 250, the first to third RAKE combiners 210, 230, and 260, and the spreading factor estimator 240 may be integrated into a single device to process channel information through time division.

Further, the first to third RAKE combiners 210, 230, and 260 refer to a tag for representing a number of each finger unit 101 included in the signal output from the dynamically allocated finger units 101 and a finger-channel mapping table, and combine as many of the output signals of the finger units as configured in respective RAKE combiners 210, 230, and 260 to generate first to third combined information.

Figure 4:
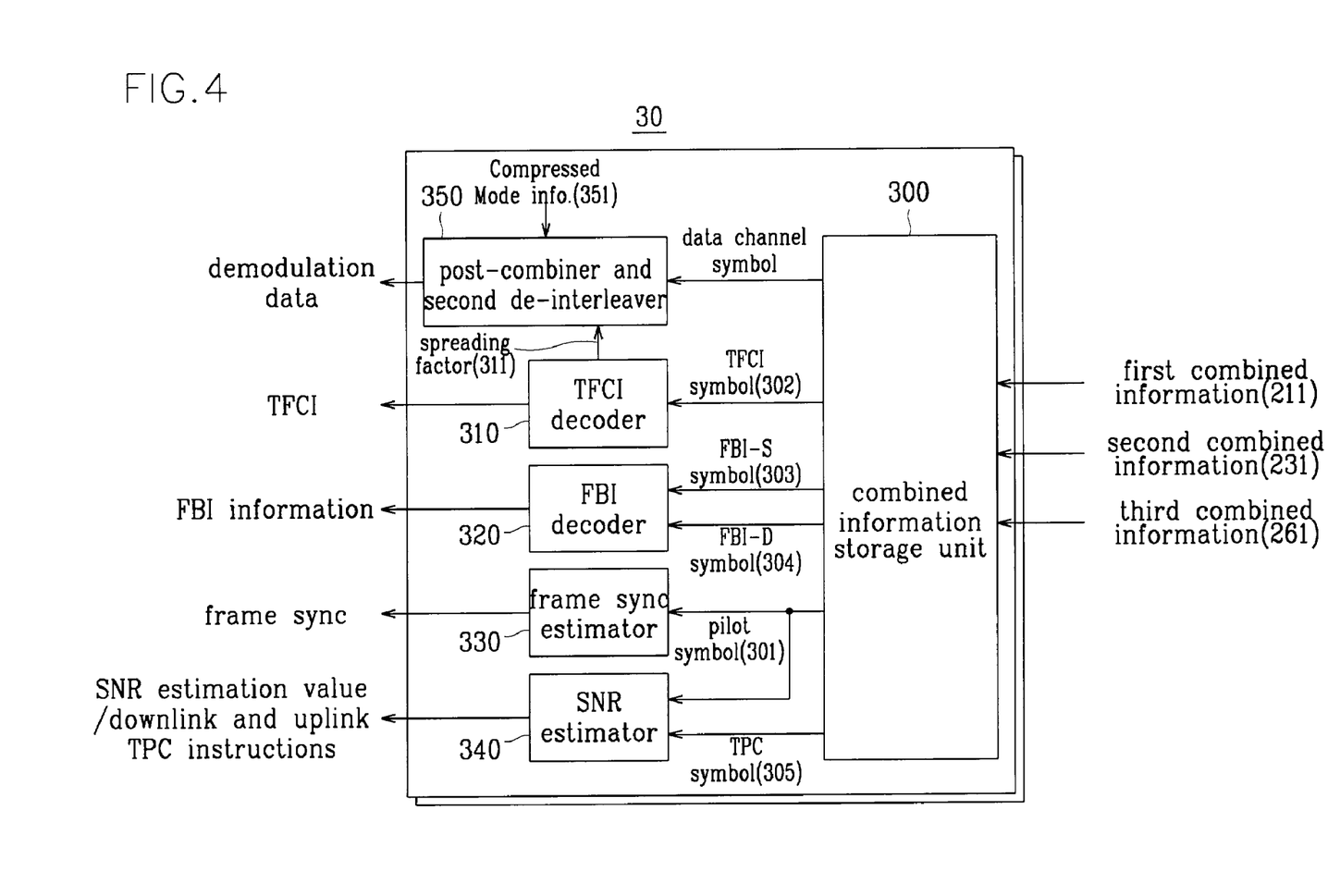
FIG. 4 shows a frame calculator of the base station demodulator according to a preferred embodiment of the present invention.

FIG. 4 shows a detailed block diagram of the frame calculator 30 of the base station demodulator according to a preferred embodiment of the present invention.

As shown, the frame calculator 30 comprises: a combined information storage unit 300; a TFCI decoder 310; an FBI decoder 320; a frame sync estimator 330; an SNR estimator 340; and a post-combiner and second de-interleaver 350.

The combined information storage unit 300 divides the first to third combined information 211, 231, and 261 output from the symbol calculator 20 into a pilot symbol 301, a TFCI symbol 302, an FBI's S field symbol 303, an FBI's D field symbol 304, a transmission power control (TPC) symbol 305, and a data channel symbol 306, and stores them.

The TFCI decoder 310 uses a TFCI symbol 302 stored in the combined information storage unit 300 to perform TFCI decoding during a frame, and detects a spreading factor 311 of a data channel of a frame.

The FBI decoder 320 uses the FBI's S field symbol 303 and the D field symbol 304 to acquire information needed for site selection diversity transmission (SSDT) and closed loop diversity (CLD).

The frame sync estimator 330 uses the pilot symbol 301 to check whether the frame is synchronized.

The SNR estimator 340 uses the pilot symbol 301 to estimate an SNR of an uplink channel and concurrently uses a TPC symbol 305 to generate downlink and uplink TCP commands.

The post-combiner and second de-interleaver 350 uses the data channel spreading factor 311 obtained by decoding the TFCI symbol 302 by the TFCI decoder 310 to perform a post-combining on the data channel symbol 306, and uses the spreading factor 311 and compressed mode information 351 to perform a second de-interleaving.

In this instance, the combined information storage unit 300, the TFCI decoder 310, the FBI decoder 320, the frame sync estimator 330, the SNR estimator 340, and the post-combiner and second de-interleaver 350 may process information on all channels through time division.

The combined information storage unit 300 adequately classifies the first to third combined information 211, 231, and 261 output by the symbol calculator 20 to satisfy different time delay and reliability conditions. For example, the TPC symbol 305, the pilot symbol 301, and the FBI's D field symbol 304 that require a minimum time delay may use the first combined information 211; the FBI's S field symbol 303 required to adjust the reliability and time delay to a predetermined level may use the second combined information 231; and the data channel symbol 306 and the TFCI symbol 302 required to increase the reliability to the maximum may use the third combined information 261.

Figure 5:
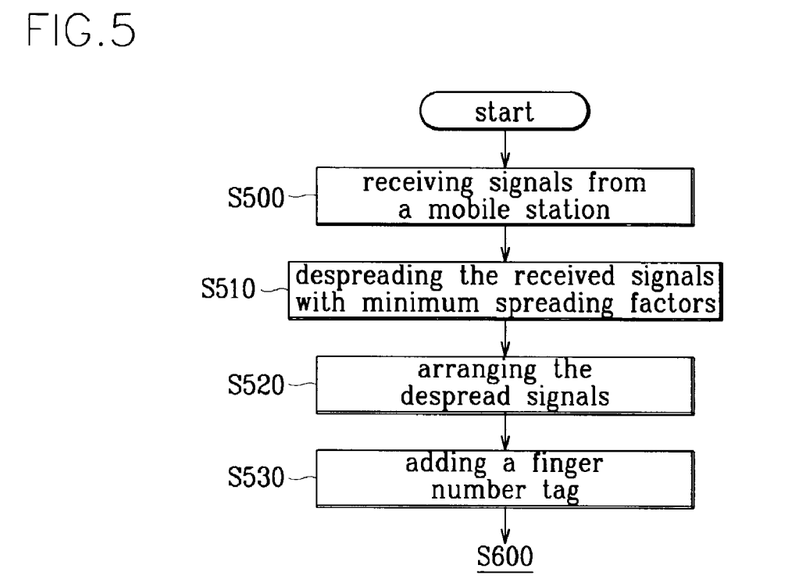
FIG. 5 shows a flowchart of a step for de-spreading a received signal in a base station demodulating method according to a preferred embodiment of the present invention.
Figure 6:
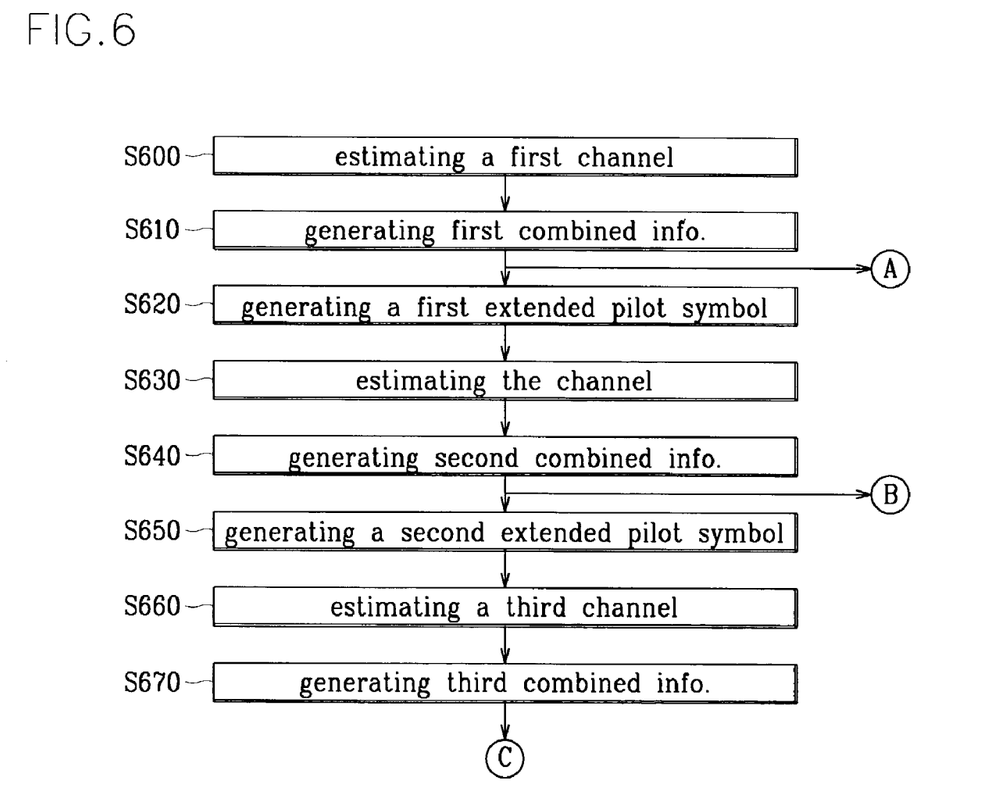
FIG. 6 shows a flowchart of a channel estimation and signal combining step according to a preferred embodiment of the present invention.
Figure 7A:
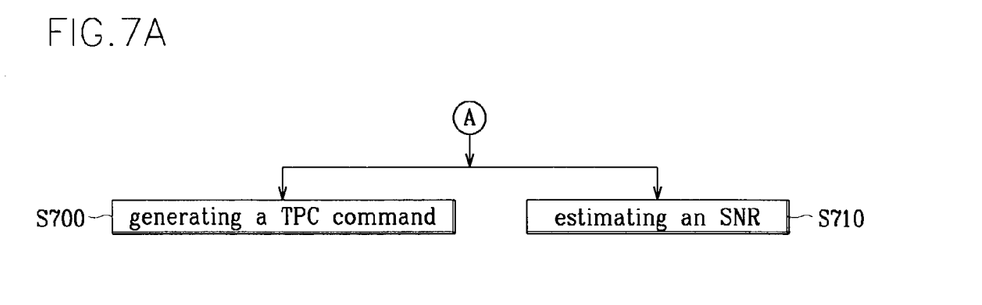
Figure 7B:
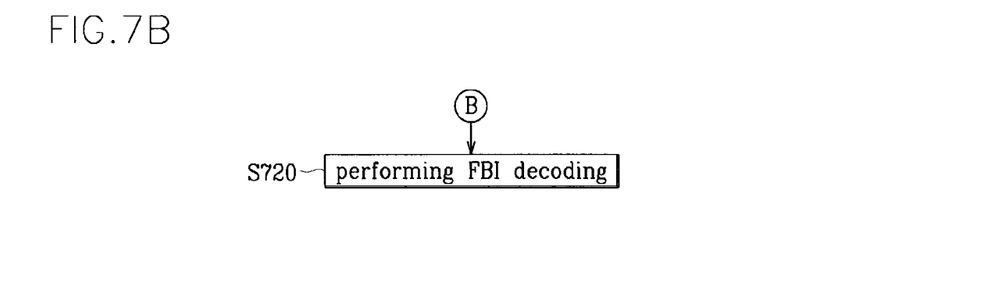
Figure 7C:
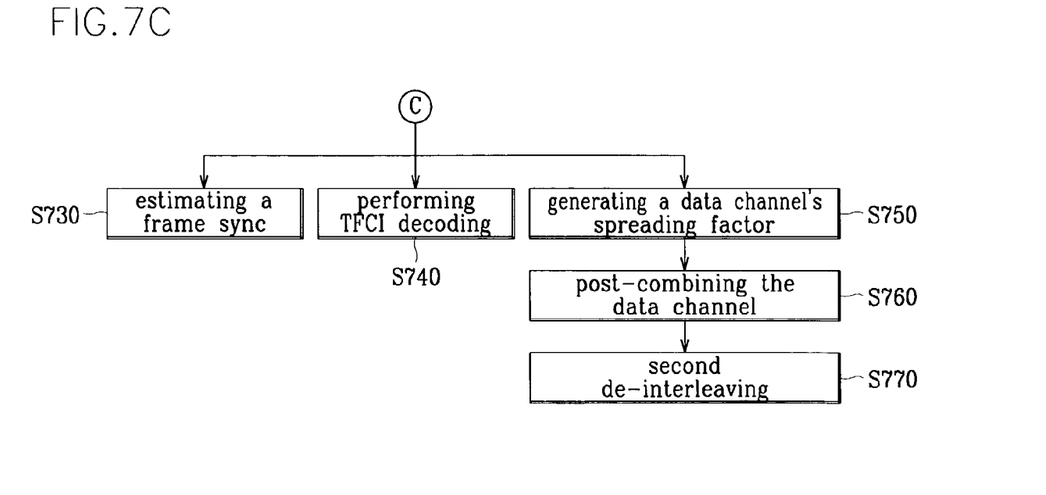

FIGS. 5 to 7(*c*) show flowcharts of the base station's decoding method according to the preferred embodiment of the present invention, with FIG. 5 showing a flowchart of a method for de-spreading a received signal, FIG. 6 showing a flowchart of a method for estimating a channel and combining signals, FIG. 7(*a*) showing a flowchart of a method for using first combined information to decode a symbol, FIG. 7(*b*) showing a flowchart of a method for using second combined information to decode a symbol, and FIG. 7(*c*) showing a flowchart of a method for using third combined information to decode a symbol.

A decoding method at a base station will now be described.

First, signals are received from a mobile station through M sectors each of which has L antennas in step S500.

Next, the received signals are de-spread with minimum spreading factors at the finger units 101 that are dynamically allocated to each user in step S510. The method for dynamically allocating the finger units 101 to each user will be described later.

The de-spread signals are arranged through scheduling in step S520, and a tag for representing the number of each finger unit 101 is added in step S530.

Next, a control channel's pilot symbol among de-spread signal symbols is used to estimate a channel through time division in step S600, and a first channel estimation value is used to combine signals output from the finger unit 101 that are dynamically allocated to each user, and generate first combined information in step S610.

Signal parts of the control channel's symbols that are not the pilot symbol among various channels' de-spread symbols are removed through decision feedback to generate a first extended pilot symbol in step S620.

Next, a first extended pilot symbol is used to estimate the channel again to yield a second channel estimation value through time division in step S630, and the second channel estimation value is used to combine the signal output from the finger unit each of which is dynamically allocated to a user and accordingly generate second combined information in step S640.

The second combined information is used to remove signal parts of control channel's symbols that are not the pilot symbol or a data channel's symbol through decision feedback and generate a second extended pilot symbol in step S650.

Next, the second extended pilot symbol is used to finally estimate the channel again to yield a third channel estimation value in step S660, and the third channel estimation value is used to combine the signals output from the finger unit each of which is dynamically allocated to a user and generate third combined information in step S670.

Next, the above-generated first to third combined information is used to decode various symbols required by the W-CDMA standard.

That is, first combined information is used to generate a TPC command in step S700, and to estimate an SNR in step S710, and second combined information is used to perform FBI decoding in step S720.

Also, third combined information is used to estimate a frame sync in step S730, and TFCI decoding is performed in step S740 to acquire a spreading factor of a data channel in step S750.

The spreading factor of the data channel is used to perform a post-combining, that is, to combine the data channel's symbols in the third combined information in step S760, and then to perform a second de-interleaving calculation in step S770.

Figure 8:
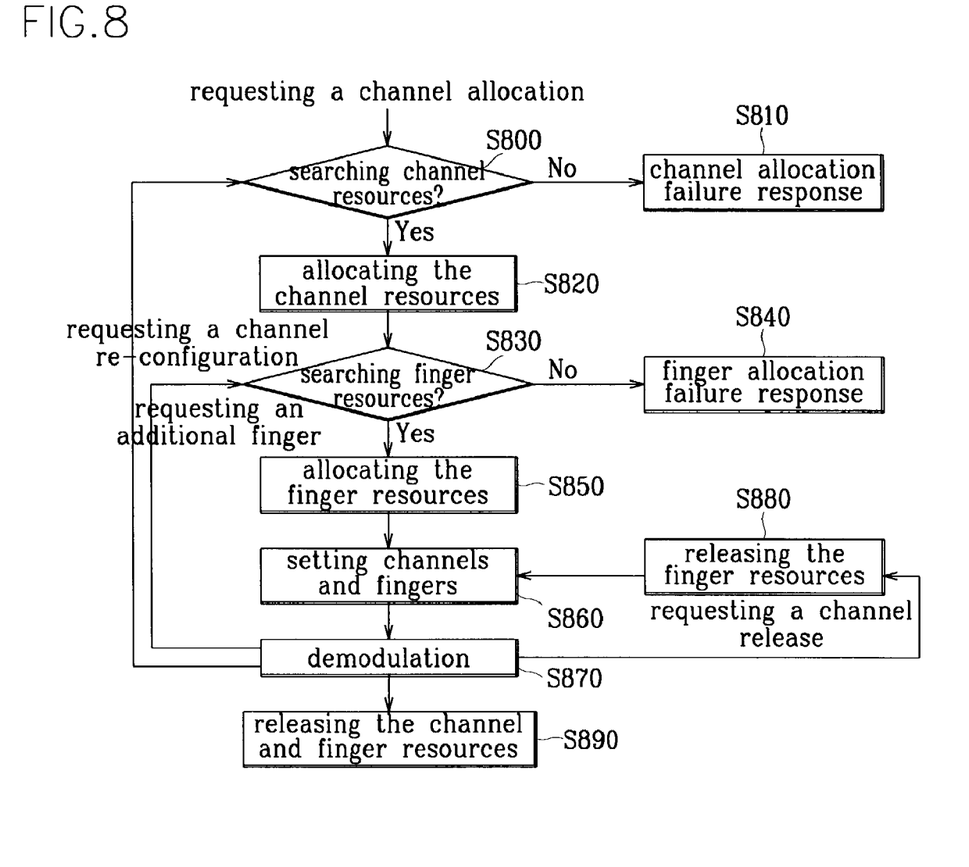
FIG. 8 shows a flowchart of a method for managing dynamic resources in a base station demodulator according to a preferred embodiment of the present invention.
Figure 9:
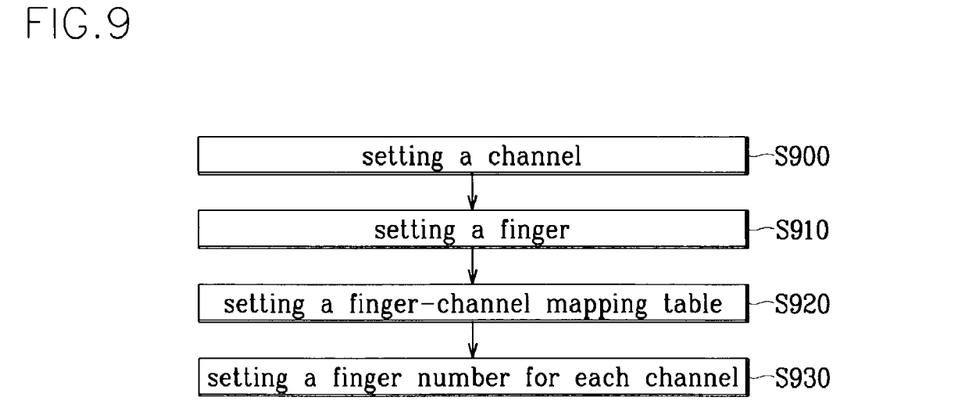
FIG. 9 shows a flowchart of a method for dynamically allocating fingers in a base station demodulator according to a preferred embodiment of the present invention.
Figure 10:
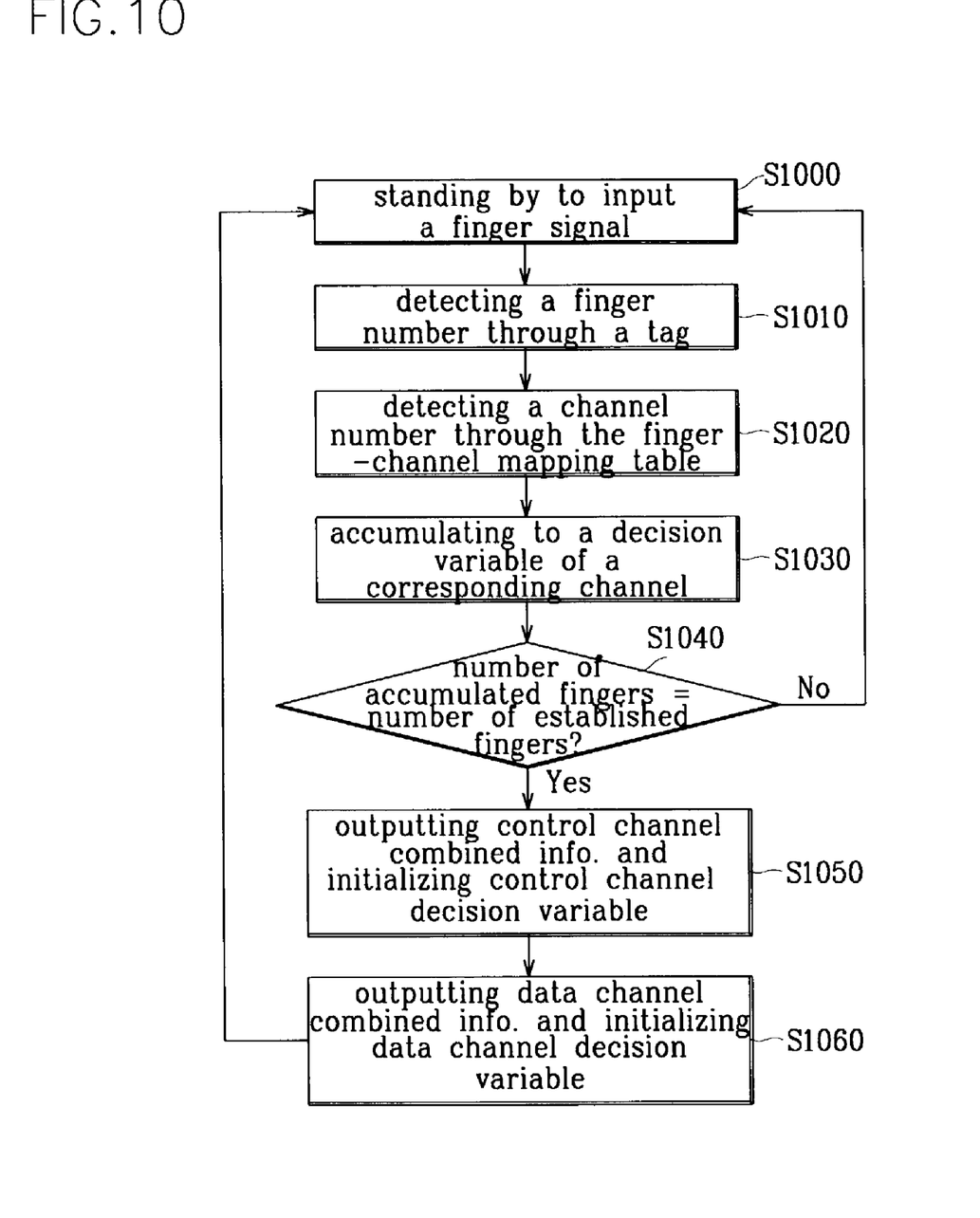
FIG. 10 shows a flowchart of a method for combining the dynamically allocated fingers in a base station demodulator according to a preferred embodiment of the present invention.

FIGS. 8 to 10 show flowcharts of respective methods for managing available dynamic resources, allocating dynamic fingers, and combining the dynamically allocated fingers from the base station demodulating device and method, according to the preferred embodiment of the present invention.

With reference to FIG. 8, a dynamic resource management method will now be described.

When a channel allocation request from a higher layer is received, channel resources including a number of channels and a capacity of a storage device needed for the channels according to service categories are searched in step S800. When a search of the channel resources fails, a channel allocation failure is reported to the higher layer in step S810. When the channel resource search is successful, a storage device area needed for the channel is allocated in step S820.

Next, finger resources including the number of fingers and a storage device capacity needed by the finger unit according to the service categories are searched in step S830. When a search of the finger resources fails, a finger allocation failure is reported in step S840. When a search of the finger resources is successful, a storage device area needed by the finger unit is allocated in step S850.

Next, after setting of needed resources for the respective channels and the finger unit is performed in step S860, a demodulating process is performed by use of a demodulating device or method in step S870.

When a channel re-configuration request is transmitted from the higher layer during performing the demodulation, resources needed for the re-configured channel are searched again in step S800.

Also, when a finger addition request is generated from the higher layer or multi-path search results, the resources for the finger unit are searched again in step S830.

When a finger release request is generated from the higher layer or the multi-path search results, the resources allocated to the corresponding finger unit are released in step S880, and setting of needed resources for the channels and the finger unit is performed again in step S860.

Finally, when a channel release request is generated from the higher layer, the allocated channel resources and the finger resources are all released in step S890.

Next, referring to FIG. 9, a dynamic finger allocation method will be described.

First, after a channel is set in step S900, a finger unit is set in step S910, a finger-channel mapping table is set in step S920, and the number of fingers for each channel is finally set in step S930.

Next, with reference to FIG. 10, a method for combining the dynamically allocated fingers at the respective RAKE combiners 210, 230, and 260 of the demodulator according to the preferred embodiment of the present invention will be described.

First, a standby mode for inputting a finger signal is performed in step S1000. When a finger signal is input, the number of the finger unit that output the finger signal is detected through a tag included in the finger signal in step S1010.

A channel number corresponding to the finger unit is detected through finger-channel mapping table in step S1020, and a channel-compensated control channel signal is accumulated to a corresponding channel's control channel decision variable in step S1030.

It is determined whether the number of accumulated fingers is matched with that of the established fingers in step S1040, and when they are not matched, the standby mode for inputting the finger signal is performed in step S1000, and when they are matched, control channel combined information is output, and a control channel decision variable is initialized in step S1050.

When the control channel symbol combining is completed, the symbols of the data channel input during the corresponding control channel symbol interval are already ready to be combined.

Finally, the respective data channel outputs are combined to generate data channel combined information by using the detected numbers of finger units and symbol positions during combining the control channel symbols and initialize a data channel decision variable in step S1060, and a standby mode for inputting a finger signal for combination of next symbols is performed in step S1000.

In the above-described embodiment, a method for demodulating physical channel data is described, and further, the demodulator according to the present invention may be combined with a portion of or all devices including a multi-path searcher, a preamble searcher, a channel decoder, and a transport channel processor to be configured into a single device or integrated on a recording medium.

According to the present invention, a plurality of channels (or fingers) are separately processed at a single device to increase device performance, manage resources such as the number of fingers for each channel, the capacity of a storage device, and calculation time in a single pool format, and dynamically allocate the resources needed for services, and therefore, limited resources are effectively managed and the channel capacity of the base station demodulator is maximized.

Also, since the channel can be estimated using all symbols of the control channel and the data channel as well as the pilot symbol of the control channel, performance of channel estimation is improved to increase radio capacity.

Further, as the channel is estimated and RAKE combined using decision feedback through three stages, three decision variables are generated, and the decision variables have features such that time delay becomes longer and reliability increases as the stages proceed. By using them, various time delay and reliability requirements for W-CDMA uplink channels and symbols may be satisfied.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A demodulator of a code division access system base station comprising:
    a chip calculator for receiving signals through a plurality of sectors each of which includes a plurality of antennas, and de-spreading the received signals;
    a symbol calculator for selectively using symbols of a control channel and a data channel from the signals de-spread by the chip calculator, estimating a channel, and combining the signals input through a multi-path;
    a frame calculator for combining the signals combined by the symbol calculator for each frame to perform transport format combination indicator (TFCI) decoding, feedback information (FBI) decoding, frame sync estimation, signal to noise ratio (SNR) estimation, and post-combining and second de-interleaving calculation;
    a storage unit for storing output values of the chip calculator, the symbol calculator, and the frame calculator;
    a storage unit controller for controlling input/output signals between the chip calculator, the symbol calculator, the frame calculator, and the storage unit; and
    a host interface for controlling input/output signals between the chip calculator, the symbol calculator, the frame calculator, and a host.

2. The demodulator of claim 1, wherein the chip calculator comprises:
    a finger pool including a plurality of finger units for de-spreading the signals received from each sector with a minimum spreading factor; and
    a channel scheduler for arranging the signals output from each finger unit of the finger pool in a queue through scheduling, and adding a tag for representing a number of each finger unit.

3. The demodulator of claim 2, wherein each finger unit of the finger pool de-spreads sixteen uplink channels through time division.

4. The demodulator of claim 2, wherein the chip calculator further comprises a time tracker for referring to output signals of the channel scheduler to adjust de-spreading start positions of each finger unit of the finger pool.

5. The demodulator of claim 2, wherein the symbol calculator comprises:
    a first channel estimator for using a pilot symbol from among de-spread symbols output from the chip calculator to estimate a channel through time division;
    a first RAKE combiner for using a first channel estimation value output from the first channel estimator, and combining the signals output from finger unit that is dynamically allocated to each user to generate first combined information, and using the first combined information to remove a data part of a control channel's symbol that is not the pilot symbol to generate a first extended pilot symbol;
    a second channel estimator for using the first extended pilot symbol to estimate the channel again to yield a second channel estimation value;
    a second RAKE combiner for using a second channel estimation value output from the second channel estimator and recombining the signals output from the finger unit that is dynamically allocated to each user to generate second combined information, and using the second combined information to remove data parts of the control channel's symbol that is not the pilot symbol and of the data channel's symbol arid generate a second extended pilot symbol;
    a third channel estimator for using the second extended pilot symbol to estimate the channel again to yield a third channel estimation value; and
    a third RAKE combiner for using the third channel estimation value output from the third channel estimator to combine the signals output from the finger unit that is dynamically allocated to each user and generate third combined information.

6. The demodulator of claim 5, wherein the symbol calculator further comprises a spreading factor estimator for using symbols of a data channel among de-spread signals output from the chip calculator to estimate a spreading factor of the data channel, and the second RAKE combiner uses a spreading factor output from the spreading factor estimator to remove a data portion from the data channel.

7. The demodulator of claim 5, wherein the first to third RAKE combiners refer to a tag for representing a number of the finger unit included in the signal output from the dynamically allocated finger unit and a finger-channel mapping table, and combine the output signals of the finger units by as many as configured in the respective RAKE combiners to generate first to third combined information.

8. The demodulator of claim 7, wherein the number of fingers and the finger-channel mapping table may be dynamically allocated.

9. The demodulator of claim 5, wherein the symbol calculator uses time division to estimate a channel, and is integrated into a single device.

10. The demodulator of claim 1, wherein the frame calculator comprises:
a combined information storage unit for classifying control channel information output from the symbol calculator into a pilot symbol, a TFCI symbol, an FBI's S field symbol, an FBI's D field symbol, and a transmission power control (TPC) symbol according to at least one condition of time delay and reliability conditions, and storing them;
a TFCI decoder for using a TFCI symbol of the combined information storage unit to perform TFCI decoding during a frame and detect a spreading factor of a data channel of a frame;
an FBI decoder for using the FBI's S field symbol and the FBI's D field symbol of the combined information storage unit to perform FBI decoding;
a frame sync estimator for using a pilot symbol of the combined information storage unit to check whether the frame is synchronized;
an SNR estimator for using a pilot symbol of the combined information storage unit to estimate an SNR of an uplink channel; and
a post-combiner and second de-interleaver for using a data channel spreading factor obtained by decoding the TFCI symbol by the TFCI decoder to perform a post-combining on the data channel symbol, and using a data channel spreading factor and compressed mode information to perform a second de-interleaving.

11. The demodulator of claim 10, wherein the frame calculator processes information of all channels through time division, and is configured into a single device.

12. The demodulator of claim 10, wherein the combined information storage unit uses first combined information of the symbol calculator to classify a pilot symbol and an FBI's D symbol, uses second combined information to classify an FBI's S symbol, and uses third combined information to classify a data channel symbol and a TFCI symbol.

13. The demodulator of claim 1, wherein a storage area of the storage unit may be dynamically allocated for each channel by as much as is needed according to service categories.

14. A demodulation method of a W-CDMA base station comprising:
(a) receiving signals from a plurality of sectors each of which includes a plurality of antennas, and de-spreading the received signals at a finger pool including a plurality of finger units;
(b) selectively using symbols of a control channel and a data channel from the de-spread signals to estimate a channel, and using a value obtained by channel estimation to combine signals input through a multi-path; and
(c) classifying the combined signals according to at least one condition of time delay and reliability conditions, and performing transport format combination indicator (TFCI) decoding, feedback information (FBI) decoding, frame sync estimation, signal-to-noise ratio (SNR) estimation, post-combining, and second de-interleaving;
wherein the step (a) comprises;
arranging the de-spread signals output from each finger unit of the finger pool in a queue through scheduling;
adding a tag for representing a number of each finger unit; and
referring to the de-spread signals to control positions of the finger unit.

15. A demodulation method of a W-CDMA base station comprising:
(a) receiving signals from a plurality of sectors each of which includes a plurality of antennas, and de-spreading the received signals at a finger pool including a plurality of finger units;
(b) selectively using symbols of a control channel and a data channel from the de-spread signals to estimate a channel, and using a value obtained by channel estimation to combine signals input through a multi-path; and
(c) classifying the combined signals according to at least one condition of time delay and reliability conditions, and performing transport format combination indicator (TFCI) decoding, feedback information (FBI) decoding, frame sync estimation, signal-to-noise ratio (SNR) estimation, post-combining, and second de-interleaving,
wherein the step (b) comprises:
using a pilot symbol of the de-spread signal to estimate a first channel through time division;
using a first channel estimation value and combining signals output from the finger unit that is dynamically allocated to each user to generate first combined information, and using the first combined information and removing a data portion of a control channel's symbol that is not the pilot symbol to generate a first extended pilot symbol;
using the first extension pilot symbol to estimate the channel again to yield a second channel estimation value;
using the second channel estimation value and recombining a signal output from a finger unit that is dynamically allocated to each user to generate second combined information, and using the second combined information and removing a control channel's symbol that is not the pilot symbol and a data portion of a data channel's symbol to generate a second extended pilot symbol;
using the second extended pilot symbol to estimate the channel again to yield a third channel estimation value; and
using the third channel estimation value and recombining a signal output from the finger unit that is dynamically allocated to each user to generate third combined information.

* * * * *